United States Patent
Mahonin et al.

(10) Patent No.: US 10,754,983 B2
(45) Date of Patent: Aug. 25, 2020

(54) ANONYMIZATION OF SENSITIVE DATA FOR USE IN USER INTERFACES

(71) Applicant: Interset Software, Inc., Santa Clara, CA (US)

(72) Inventors: Josh Christopher Tyler Mahonin, Ottawa (CA); Michael John Cyze, Kincardine (CA); Michael Iles, Ottawa (CA); Shaun Pilkington, Ottawa (CA); Wesley Lawrence, Ottawa (CA); Stephan Jou, Richmond Hill (CA)

(73) Assignee: Interset Software Inc., Santa Clara, CA (US)

( * ) Notice: Subject to any disclaimer, the term of this patent is extended or adjusted under 35 U.S.C. 154(b) by 180 days.

(21) Appl. No.: 15/475,922

(22) Filed: Mar. 31, 2017

(65) Prior Publication Data

US 2018/0285597 A1    Oct. 4, 2018

(51) Int. Cl.
G06F 21/62 (2013.01)
G06F 21/60 (2013.01)
H04L 9/32 (2006.01)

(52) U.S. Cl.
CPC ........ G06F 21/6254 (2013.01); G06F 21/602 (2013.01); H04L 9/3239 (2013.01); H04L 2209/42 (2013.01)

(58) Field of Classification Search
CPC ... G06F 21/6254; G06F 21/602; H04L 9/0643
USPC ........................................................ 713/189
See application file for complete search history.

(56) References Cited

U.S. PATENT DOCUMENTS

| | | | | |
|---|---|---|---|---|
| 5,751,810 | A * | 5/1998 | Miyaji ............... | G06Q 20/3821 380/259 |
| 6,785,815 | B1 * | 8/2004 | Serret-Avila .......... | G06T 1/0071 348/E7.06 |
| 7,565,513 | B2 * | 7/2009 | Ahmed .................. | G06F 9/384 712/209 |
| 7,774,854 | B1 * | 8/2010 | Watson ............... | G06F 21/6209 726/26 |
| 8,171,549 | B2 * | 5/2012 | Radatti ................. | G06F 21/563 713/153 |
| 8,209,549 | B1 * | 6/2012 | Bain, III ............. | G06F 21/6245 380/2 |
| 8,667,273 | B1 * | 3/2014 | Billstrom ............ | G06F 21/6209 713/165 |
| 9,176,972 | B1 * | 11/2015 | Schouten ............... | G06F 16/164 |
| 9,460,302 | B2 * | 10/2016 | Sathaye .................. | G06F 21/62 |
| 2005/0027982 | A1 * | 2/2005 | Haparnas ............... | H04W 12/06 713/168 |
| 2007/0076866 | A1 * | 4/2007 | Vanstone ............... | H04L 9/0841 380/30 |
| 2009/0313269 | A1 * | 12/2009 | Bachmann ............ | G06F 21/645 |
| 2010/0031039 | A1 * | 2/2010 | Ciet ........................ | H04L 9/001 713/168 |
| 2011/0314278 | A1 * | 12/2011 | Taskaya .............. | H04L 63/0428 713/167 |

(Continued)

*Primary Examiner* — Farid Homayounmehr
*Assistant Examiner* — Thanh T Le

(57) ABSTRACT

Sensitive data may be anonymized for use in user interfaces by applying a cryptographic hash function to the data. The hashed value may be broken into hash tokens and the hash tokens converted to human readable tokens using a 1:1 conversion function. The human readable tokens can then be concatenated together to provide a human readable identifier of the sensitive data.

20 Claims, 12 Drawing Sheets

(56) References Cited

U.S. PATENT DOCUMENTS

| | | | | |
|---|---|---|---|---|
| 2013/0282679 A1* | 10/2013 | Khin | ................... | G06F 16/258 707/698 |
| 2014/0136838 A1* | 5/2014 | Mossbarger | ............ | H04L 9/006 713/156 |
| 2014/0164352 A1* | 6/2014 | Denninghoff | ............ | H03H 9/25 707/711 |
| 2015/0067881 A1* | 3/2015 | Badstieber | .............. | G06F 16/13 726/26 |
| 2015/0143125 A1* | 5/2015 | Nix | ....................... | H04L 9/0861 713/171 |
| 2016/0034692 A1* | 2/2016 | Singler | ............... | H04L 67/1095 726/26 |
| 2016/0342812 A1* | 11/2016 | Lynch | ................ | H04L 63/0407 |
| 2017/0149793 A1* | 5/2017 | Spertus | ................ | H04L 63/105 |
| 2018/0144152 A1* | 5/2018 | Greatwood | ......... | G06F 21/6218 |

* cited by examiner

US 10,754,983 B2

ANONYMIZATION OF SENSITIVE DATA FOR USE IN USER INTERFACES

TECHNICAL FIELD

The current disclosure relates to anonymization of sensitive data and in particular to anonymization of sensitive data for use in a user interface.

BACKGROUND

Data may be anonymized to protect the sensitive information in datasets. For example, names of individuals may be anonymized by using a cryptographic hash function that converts the name to an output value of a fixed size. The hash function will generate a unique hash value for a unique name, which allows the anonymized data to be analyzed without compromising personal information.

Anonymizing information using a hash function can securely generate a corresponding token from the sensitive data. However, the hashed value resembles a random alphanumeric string making reading the hashed values difficult. When the sensitive data is intended to be included in a user interface, using a hashed value can make understanding the information presented in the user interface difficult. For example, a user interface that displays user information may be easier to understand when identifying individual users by their names, such as "Tim Johnson", "Frank Thomas", etc. The user interface may be more difficult to understand when the individual user's names are replaced by anonymized hash values such as "7ab034b02b35902d074d0eba077b32a9" or "aab50cf88d2ae72ebd4835362d5e3b61."

Attempts at improving the readability of hash values have included selecting a name for each hash value as required. For example, a first hashed value may be converted to "user 1", a second hashed value may be converted to "user 2", etc. However, creating identifiers in such a manner requires maintaining and updating a list of identifiers as the hash values are processed. Maintaining and updating such a list with new identifiers, which requires locking access to a global counter sentinel or similar counter, makes parallelizing and scaling such a process difficult.

An additional, alternative and/or improved process for anonymizing sensitive data would be desirable.

BRIEF DESCRIPTION OF THE DRAWINGS

Features, aspects and advantages of the present disclosure will become better understood with regard to the following description and accompanying drawings in which.

DETAILED DESCRIPTION

In accordance with an aspect of the present disclosure there is provided a method of anonymizing sensitive data comprising: splitting a secure hashed value generated from sensitive data to be anonymized into a plurality of hash tokens; converting each of the plurality of hash tokens to a respective human-readable token using a 1:1 conversion process; and concatenating the plurality of human-readable tokens into an anonymized human-readable identifier of the sensitive data.

In accordance with another aspect of the present disclosure there is provided a system of anonymizing sensitive data comprising: a processing unit for executing instructions; and a memory unit for storing instructions, which when executed by the processing unit configure the system to: split a secure hashed value generated from sensitive data to be anonymized into a plurality of hash tokens; convert each of the plurality of hash tokens to a respective human-readable token using a 1:1 conversion process; and concatenate the plurality of human-readable tokens into an anonymized human-readable identifier of the sensitive data.

Datasets may have portions that should be anonymized. The data may be anonymized in order to protect sensitive or personal information or to remove data that may bias analysis or interpretation of the datasets. Anonymizing data may be accomplished by performing a cryptographic hash function on the piece, or pieces, of data to be anonymized. Although hash functions may generate different lengths of message digests, assuming the hash value is a 128-bit value it may be represented as a string of 32 hexadecimal values. While the hash values allow the anonymized data to be analyzed, understanding the hash values may be difficult for a human to understand. For example, if the data to be anonymized is associated with individual names, it is may be difficult for a person to associate the hash value of "bb030c487741131b2643ea8878153f42" with an individual's name. The anonymization process described further herein provides a scalable approach for anonymizing data and converting the hash values to human-readable identifiers. The human-readable identifiers may be generated from the hash values so that the human-readable identifiers are semantically similar to the anonymized data. For example, if the anonymized data are names, the human-readable identifiers may also be names, or at least appear to be names. The human-readable anonymization process takes a hash value, splits it into a number of hash tokens which are each used to generate a corresponding human-readable token. The generated human-readable tokens may then be concatenated together to provide the human-readable identifier corresponding to the cryptographic hash value of the anonymized data.

Figure 1:
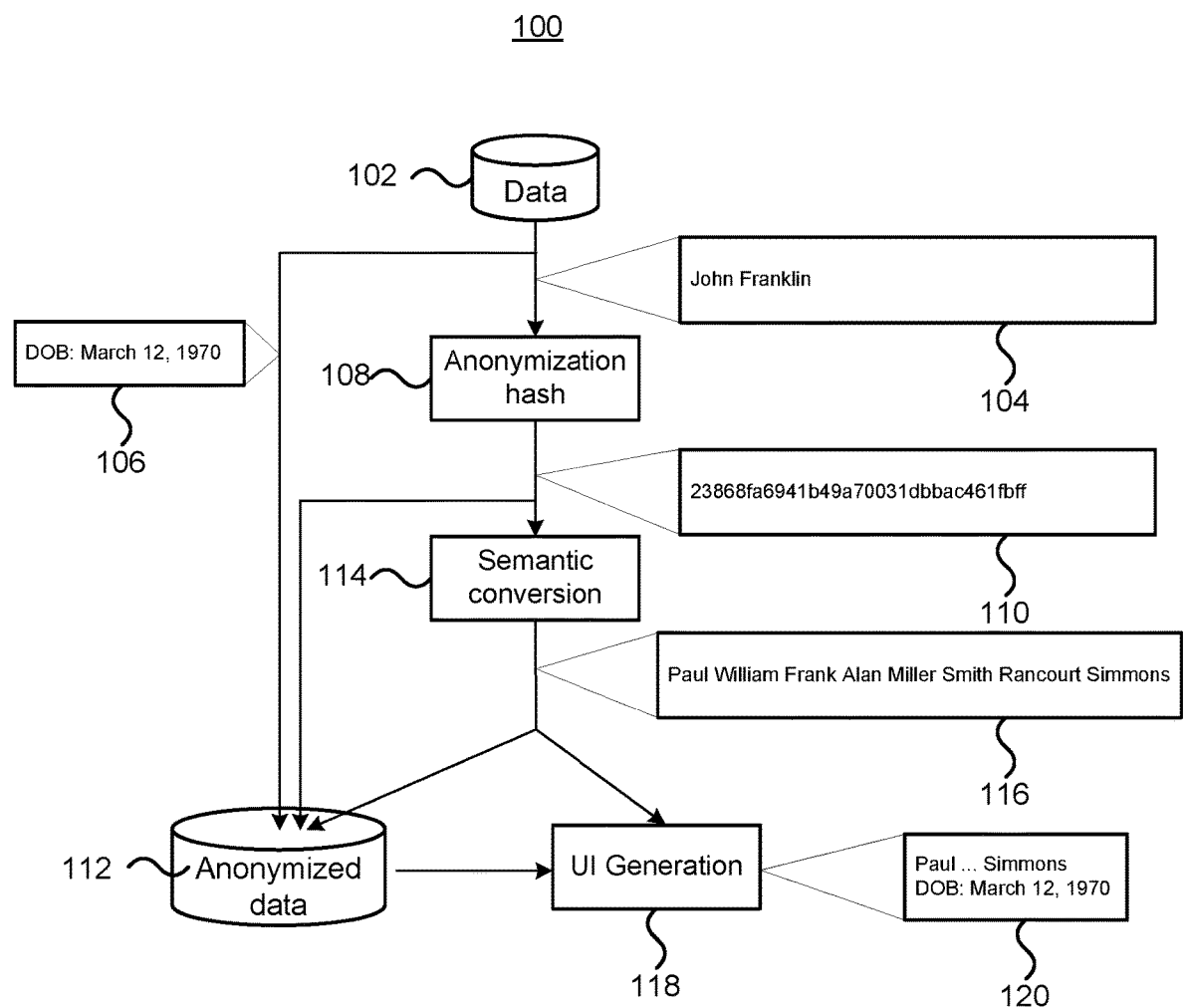
FIG. 1 depicts a process for anonymization of sensitive data for use in a user interface.

FIG. 1 depicts a process for anonymization of sensitive data for use in a user interface. As described further herein, the sensitive data is anonymized using a cryptographic hash that is then converted to a human readable string, such as a person's name for display. Converting the hash value to a human readable string may facilitate the understanding of presented data. The process 100 depicted in FIG. 1 assumes that a database 102 stores a dataset that includes data 104 to be anonymized. The data 104 is depicted as comprising a name, which may be associated with other data 106 not to be anonymized, such as a date of birth. It is assumed that the name is to be anonymized and the date of birth does not need to be anonymized; although the particular data to be anonymized may vary. As depicted, the data to be anonymized is passed to an anonymization hash function 108 that uses a cryptographic hash function to generate a secure hashed value 110 of the data to be anonymized. The anonymization hash function 108 may be any cryptographic hash function, such as MD5, SHA1, SHA256, etc. Cryptographic hash functions take a string of arbitrary length, which may also be referred to as a message, and outputs a bit string, or message digest, of a fixed length such as 128 bits. As depicted in FIG. 1 the anonymization hash function 108 receives the name 104 to be anonymized and generates a secured hash value 110. Cryptographic hash functions are functions that given a message, it is computational easy to generate the corresponding message digest; whereas given message digest it is computationally infeasible to generate the corresponding message.

The secured hash value 110 generated by the anonymization hash function 108 and the non-anonymized data 106 may be stored in association with each other in a database 112 of anonymized data as depicted, although it is possible that in certain applications it may not be necessary to store the secured hash value 110 in association with the non-anonymized data 106. The database 112 maybe and sometimes is implemented as a physical data storage device, e.g., memory or had disk, which stored information e.g., the second has value 110 and/or associated anonymized data 106. As will be appreciated, if the data to be anonymized is a name, using the secured hash value in presenting the data, for example for analysis or studying by a human, may make understanding the presented more difficult to the human as the secured hash value 110 is not easily recognizable as a name.

The secured hash value 110 is provided to a semantic conversion function 114 that converts the secured hash value 110 back into a human readable string in order to provide semantic context back to the secured hash value. For example, if the data to be anonymized is a person's name, the semantic conversion function may convert the secured hash value to what appears to be a name which provides semantic context to the secured hash value. The semantic conversion function 114 is a 1:1 function that determines a unique string for each different secure hash value. Given the same input, the semantic conversion function 114 generates the same output. The semantic conversion function 114 may not be a cryptographic function in the sense that given a name generated by the semantic conversion function 114, it may be possible, and even computationally simple, to determine the secured hash value. However, since it is the anonymization hash function 108 that provides the anonymization of the data, it is believed to be acceptable to be able to determine the secured hash value given a semantically converted string 116. As depicted, given a secured hash value of, for example, "23868fa6941b49a70031dbbac461fbff" the semantic conversion functionality 114 generates a human readable semantically converted string 116 of, for example, "Paul William Frank Alan Miller Smith Rancourt Simmons". Various implementations of how the semantic conversion may be performed are described in further detail below.

The semantically converted string 116 may be stored in association with the secured hash value 110 and the non-anonymized data 106; however, since the semantically converted string 116 may be easily generated from the secured hash value 110, it may not be necessary to store the human readable version of the secured hash value. In some but not all embodiments, e.g., when the semantically converted string 116 may be easily generated from the secured hash value 110 the semantically converted string corresponding to the secured hash value 110 is not stored in the database 112 that stores the secured hash value 110. Similarly, since the secured hash value may be determined from the semantically converted string 116, the secured hash value need not be stored in the anonymized database 112. Accordingly, in some but not all embodiments, the semantically converted string corresponding to a secured hash value 110 is stored in the database 112 and the corresponding secured hash value is not stored in the database 112.

The semantically converted string 116, either received from the semantic conversion function 114 or retrieved from the anonymized database 112 may be used by user interface generation functionality 118 that generates a user interface that displays 120 one or more human readable secured hash values, and possibly non-anonymized data.

The semantic conversion functionality generates the human readable string 116 from the secured hash value in a 1:1 manner. According, the human readable string may be formed from a plurality of words or names. As depicted, the human readable string 116 may be a combination of 8 individual names. A user interface may only be associated with a small subset of all possible secured hash values or the human readable equivalent. Accordingly, the UI generation component may shorten the human readable strings so that they may be easier to read, while still providing unique strings within the subset of contextually converted secured hash values that may be displayed in the UI.

Figure 2:
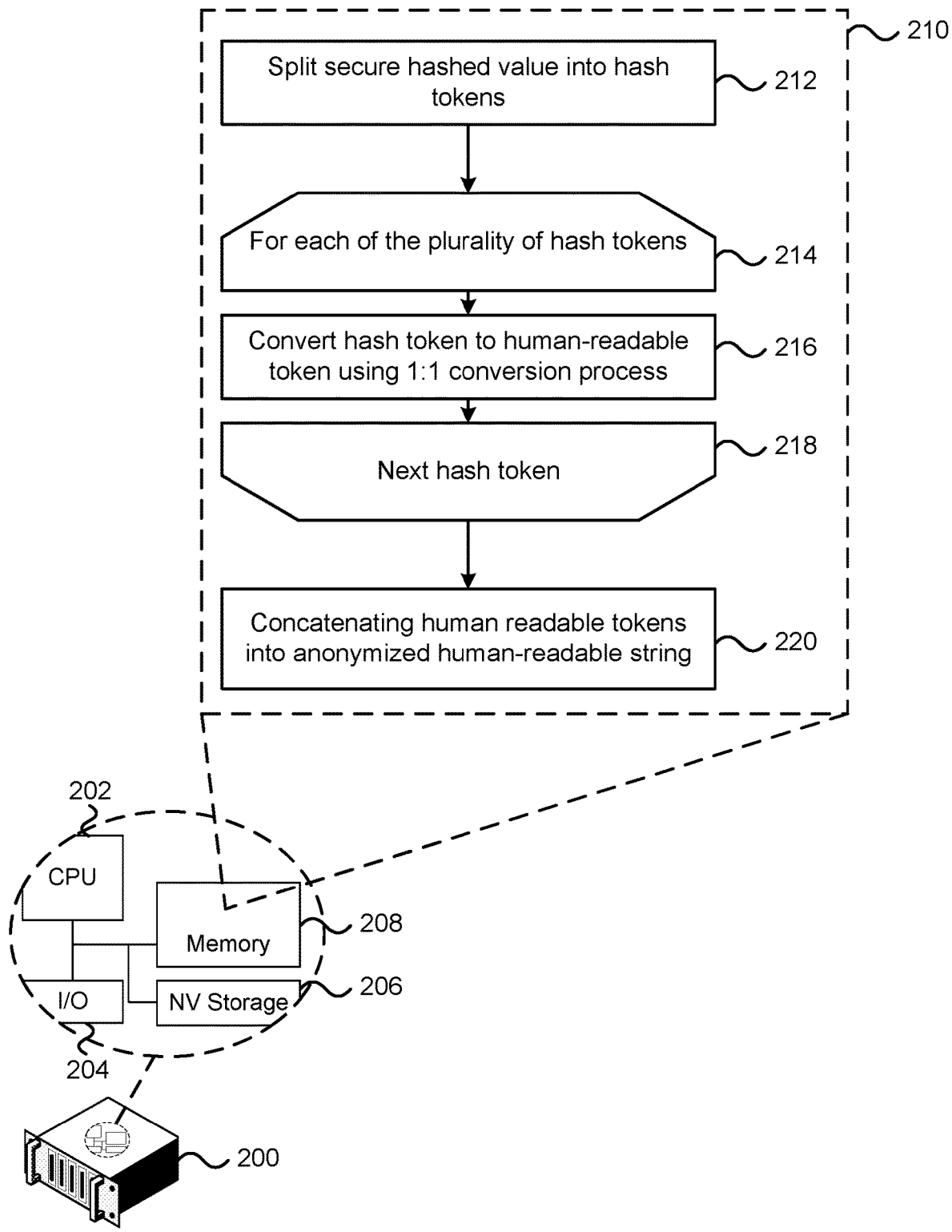
FIG. 2 depicts a system and method for anonymizing sensitive data for use in a user interface.

FIG. 2 depicts a system and method for anonymizing sensitive data for use in a user interface. The system shown in FIG. 2 can be used to implement the process shown in FIG. 1. The system is depicted as comprising a single server computing device 200; however, as described in further detail below, the anonymization process may be easily scaled to multiple servers. The server 200 is depicted as comprising a processing unit 202 capable of executing instructions. One or more input/output (I/O) interfaces 204 may be coupled to the processing unit 202. The I/O interface 204 may allow additional components to be connected to the processing unit. The additional components may include a wide variety of components, including for example wired or wireless network interfaces, keyboards mice, touch sensitive devices, speakers, printers, displays, etc. The server 200 may further include non-volatile storage 206 as well as volatile storage such as memory unit 208, which may comprise for example random access memory. The memory unit 208 may store instructions, and data, which when executed by the processing unit 202 configure the server 200 to provide various functionality including the human readable anonymization functionality 210.

The human readable anonymization function 210 receives a secure hashed value and splits the secured hash value into a plurality of hash tokens (212). The individual hash tokens are individual substrings of the secured hash value. For each of the plurality of hash tokens (214) the hash token is converted to a human-readable token using 1:1 conversion process (216). The 1:1 conversion process may take a hash token such as "2386" and convert it to a predetermined human-readable token such as "Paul". The 1:1 conversion process may utilize a simply database, or other data structure, look-up to determine a human-readable token that is associated with the hash token. The next hash token (218) is similarly converted to a human readable token until all of the hash tokens have been converted. Although described as occurring sequentially, it is possible to convert each of the hash tokens to corresponding human readable tokens in parallel. Once all of the human readable tokens have been generated they are concatenated together to provide an anonymized human-readable string (220). The human-readable string generated by the functionality 210 may be used either directly in a user interface or may be stored, either temporarily or permanently, for future use. Although described as being used for display in a user interface, the human-readable strings may be used for other purposes. Since each human readable string corresponds 1:1 with a secure hashed value, the human readable strings may be used in place of the hashed values for example in analysis of datasets or other in other uses.

Figure 3:
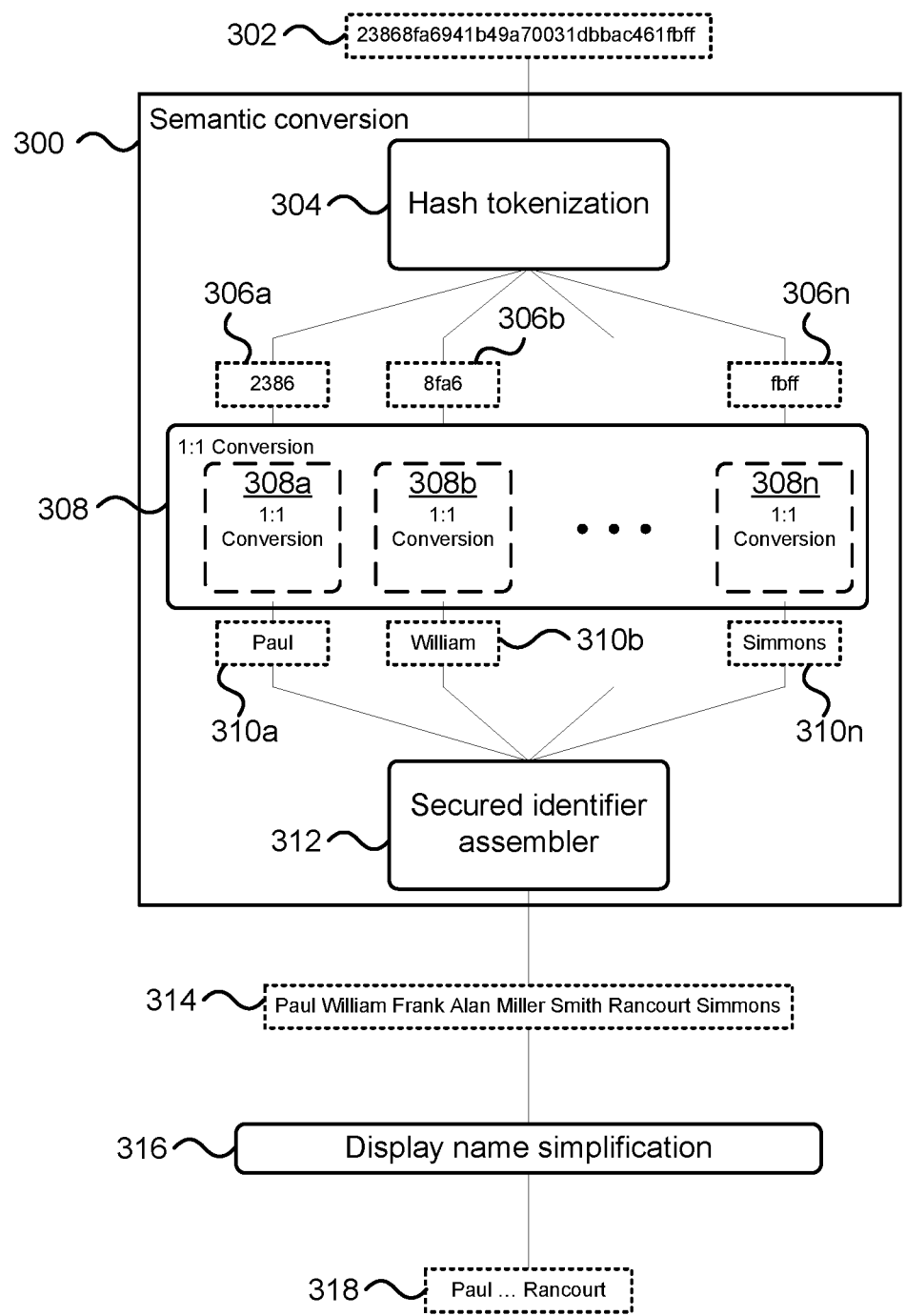
FIG. 3 depicts a process of semantic conversion of hash values.

FIG. 3 depicts a process of semantic conversion of hash values. The semantic conversion functionality described above may be implemented in various ways. FIG. 3 depicts a semantic conversion process implemented by a semantic conversion component 300. A secure hashed value 302 may be provided to a hash tokenization component 304 of the semantic conversion component 300. As depicted, the secure hashed value may be a 128-bit value, which is depicted as 32 hexadecimal values. The hash tokenization component 304 receives the secure hashed value 302 and splits the value into a plurality of individual hash tokens 306a . . . 306n (referred to collectively as hash tokens 306). As depicted in FIG. 3, the hash tokenization component 304 splits the hash value 302 into consecutive 16-bit, or 4 hexadecimal values, substrings. In other words, as depicted, the hash tokenization process splits the first 16 bits to the first hash token 306a, the next 16 bits are split into the second hash token 306b, and the process continues until all of the hash tokens have been generated. The individual hash tokens 306 are provided to a 1:1 conversion component 308 that converts each individual hash token 306a . . . 306n to a corresponding human readable token 310a . . . 310n (referred to collectively as human readable tokens 310). The 1:1 conversion component 308 may be provided in various ways; however, as depicted, the 1:1 conversion component 308 may comprise a plurality of individual 1:1 conversion components 308a . . . 308n for converting each of the hash tokens 306 to a corresponding one of the human readable tokens 310.

The human readable tokens 310 may be provided to a secured identifier assembler component 312 that combines the plurality of individual human readable tokens 310 together to provide human-readable identifier 314 of the sensitive data that was cryptographically hashed to generate the hashed value 302. The assembler component 312 is depicted as simply concatenating the human readable tokens, with intervening spaces. The assembler may combine the human readable tokens in other ways such as re-ordering the order the human readable tokens are concatenated in, although such re-ordering may not provide any additional security since the resulting human readable identifier 314 corresponds 1:1 with the hashed value and as such, both the hash token conversion and human readable token assembly is done in a predetermined and deterministic manner.

The human readable identifier 314 may be used in a user interface or may be provided to a display name simplification component 316 that may reduce the size of the human readable identifier 314 based on a set of human readable identifier 314 that may be displayed in the user interface. It may be sufficient for certain tasks, such as distinguishing one user name from another, to only use the first name and last initial (e.g. "Mary J" and "John S") as abbreviations. Accordingly, even with a large set of names, societal conventions allow for easy abbreviations that are sufficiently unique for the UI. As depicted the display name simplification component 316 receives a complete human readable identifier 314 and outputs a shortened human readable identifier 318. Although not depicted in FIG. 3, the display name simplification component may also receive an indication of other human readable identifiers that may potentially be displayed in the user interface. For example, if a user interface may display one or more human readable identifiers from a set of 1000 human readable identifiers, the display name simplification component may compare the 1000 human readable identifiers to each other to shorten the length of the identifiers while still ensuring that the set of possible identifiers remains unique. As depicted this may shorten the complete human readable identifier of "Paul William Frank Alan Miller Smith Rancourt Simmons" to "Paul . . . Rancourt". The simplification component 316 remove one or more of the human readable tokens as well as insert an ellipsis, or other indication that the human readable identifier has been shortened. The display name simplification may be done simply for the sake of display, and the complete human readable identifier may still be associated with the shortened identifier so that a user could view the complete identifier if desired.

Figure 4A:
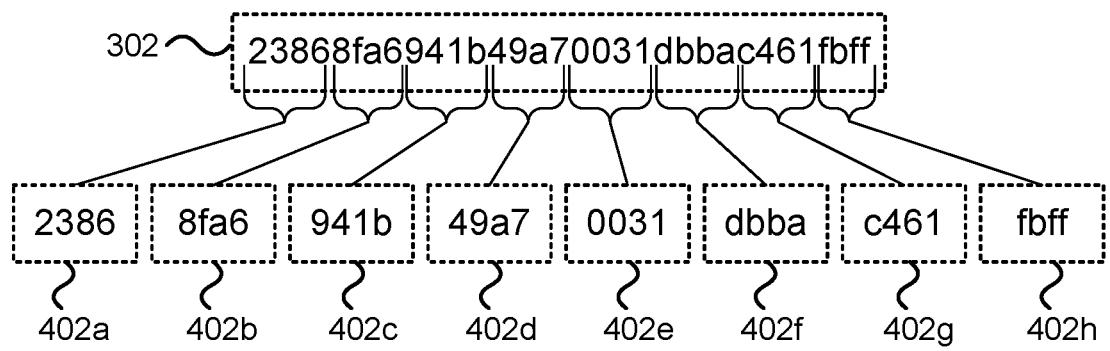
FIGS. 4A, 4B and 4C depict hash tokenization.
Figure 4B:
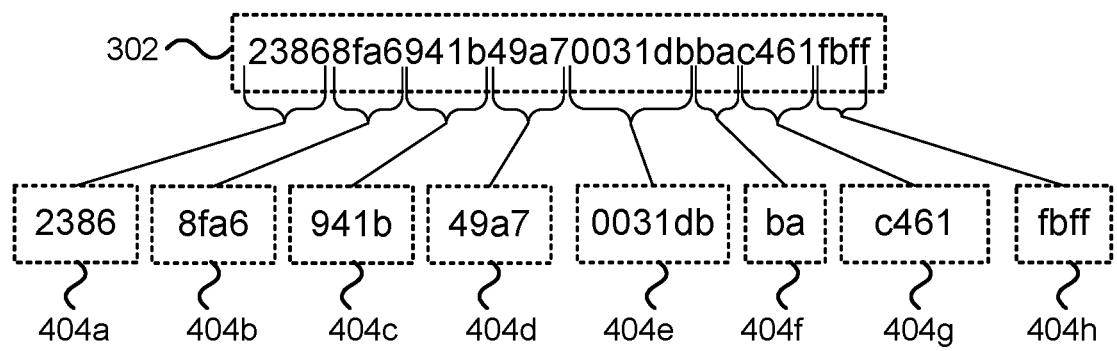
Figure 4C:
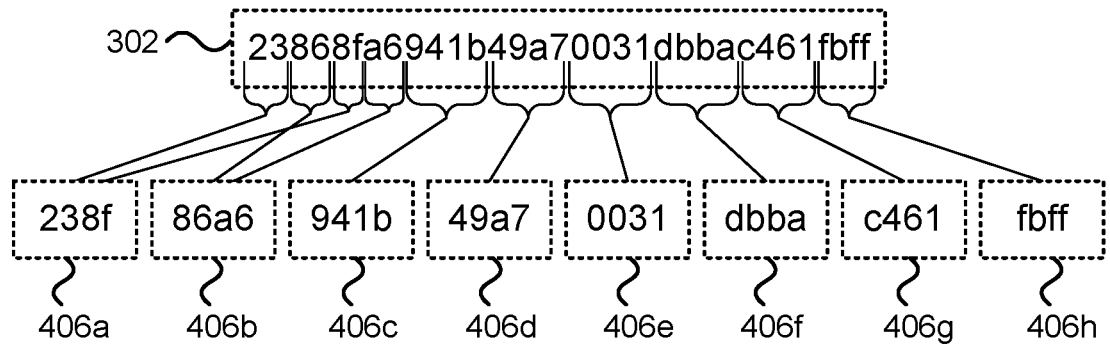

FIGS. 4A-4C depict hash tokenization. As described above, a hash tokenization component may split a secure hashed value into a plurality of individual hash tokens. The hashed value may be split in various ways. FIG. 4A depicts splitting a hash 128-bit hash value 302 into 8 equally sized hash tokens 402a . . . 402h. Each of the hash tokens 402a . . . 402h are generated from consecutive 16-bits of the hash value 302. FIG. 4B depicts splitting the hashed value 302 into unequally sized groups of consecutive bits of the hash tokens 404a . . . 404h. For example, hash token 404e is 24 bits long while hash token 404f is 8 bits long. FIG. 4C depicts spitting the hash value 302 into hash tokens 406a . . . 406h from non-consecutive bit groupings of the hash value 302. Although particular hash tokenizations are depicted in FIGS. 4A-4C, other tokenizations are possible having different tokenization characteristics, including the total number of hash tokens generated, the size of individual hash tokens and the order of the bits split from the hash value into the hash tokens.

Figure 5:
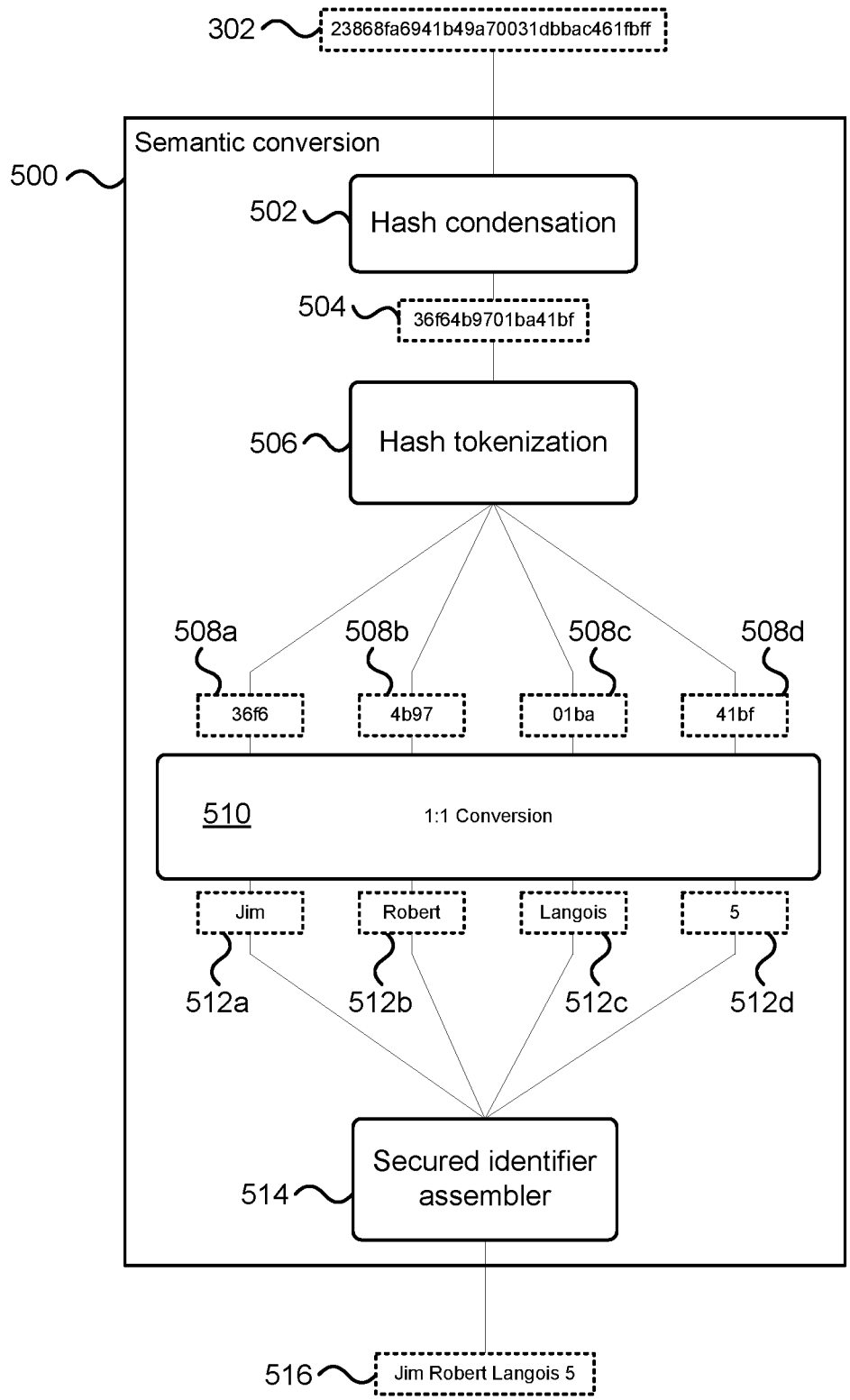
FIG. 5 depicts a further process of semantic conversion of hash values.

FIG. 5 depicts a further process of semantic conversion of hash values. The process depicted in FIG. 5 is similar to the semantic conversion depicted in FIG. 3. However, in FIG. 5 the cryptographically hashed value 3-2 may be condensed by a hash condensation component 502 of the semantic conversion component 500. The hash condensation component 502 may condense the hashed value to a shorter value. For example, the 128-bit hashed value 302 may be condensed by the hash condensation component into a 64-bit value 504. The hash condensation may be performed in various ways, including for example using a hash function producing a desired length of message digest. The semantic conversion component 500 is similar to the semantic conversion component 300 however the hash tokenization component 506 receives the smaller condensed hash 504 and generates fewer hash tokens 508a . . . 508d. The hash tokens 508a . . . 508d are converted by a 1:1 conversion component 510 into corresponding human readable tokens 512a . . . 512d. The human readable tokens may then be combined together by a secured identifier assembler component 514 to produce a human readable identifier 516. As depicted, the human readable identifier 516 is shorter than the human readable identifier 314 since it is generated from the shorter condensed hash 504.

Figure 6:
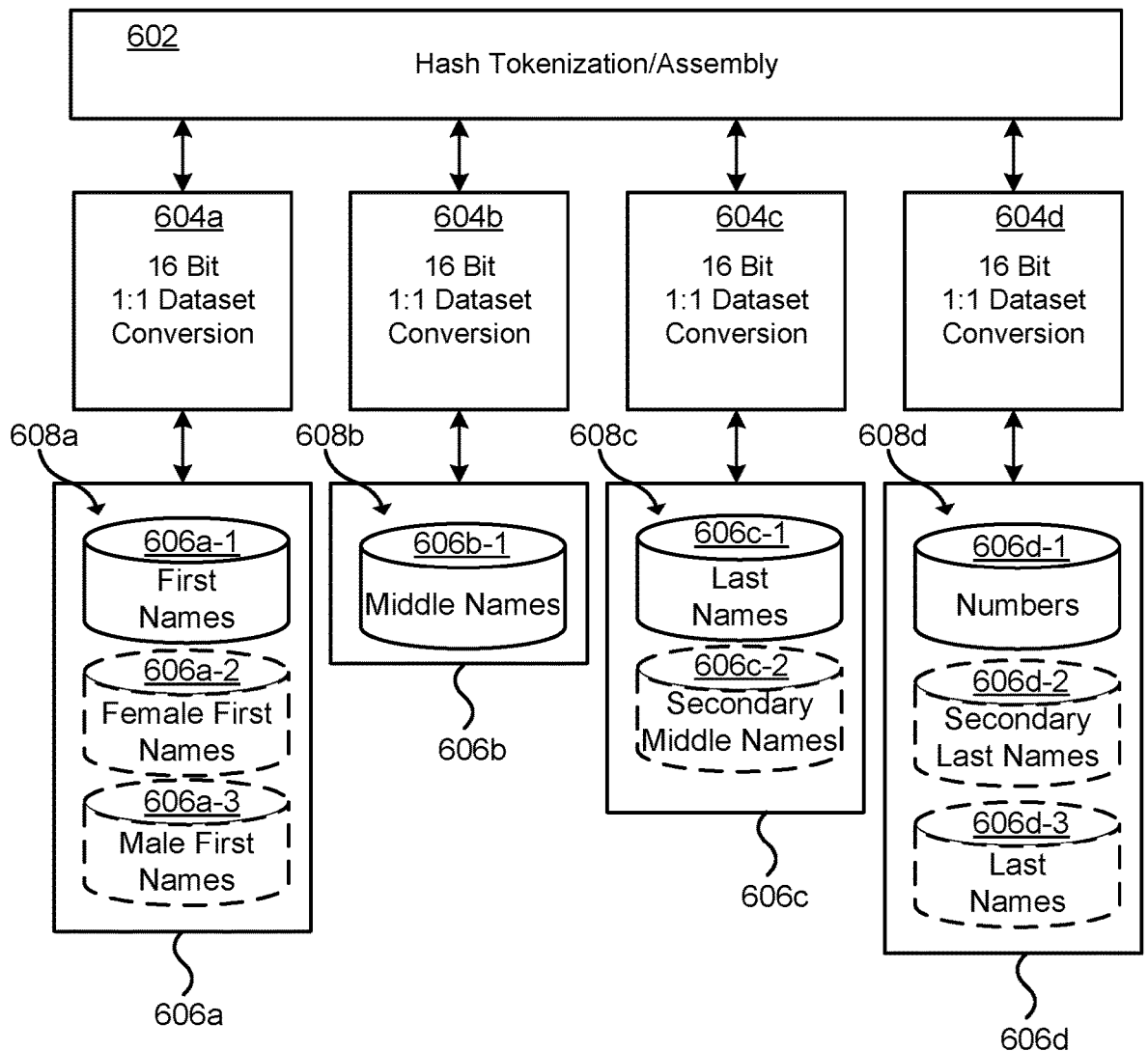
FIG. 6 depicts generation of a human-readable identifier.
Figure 7:
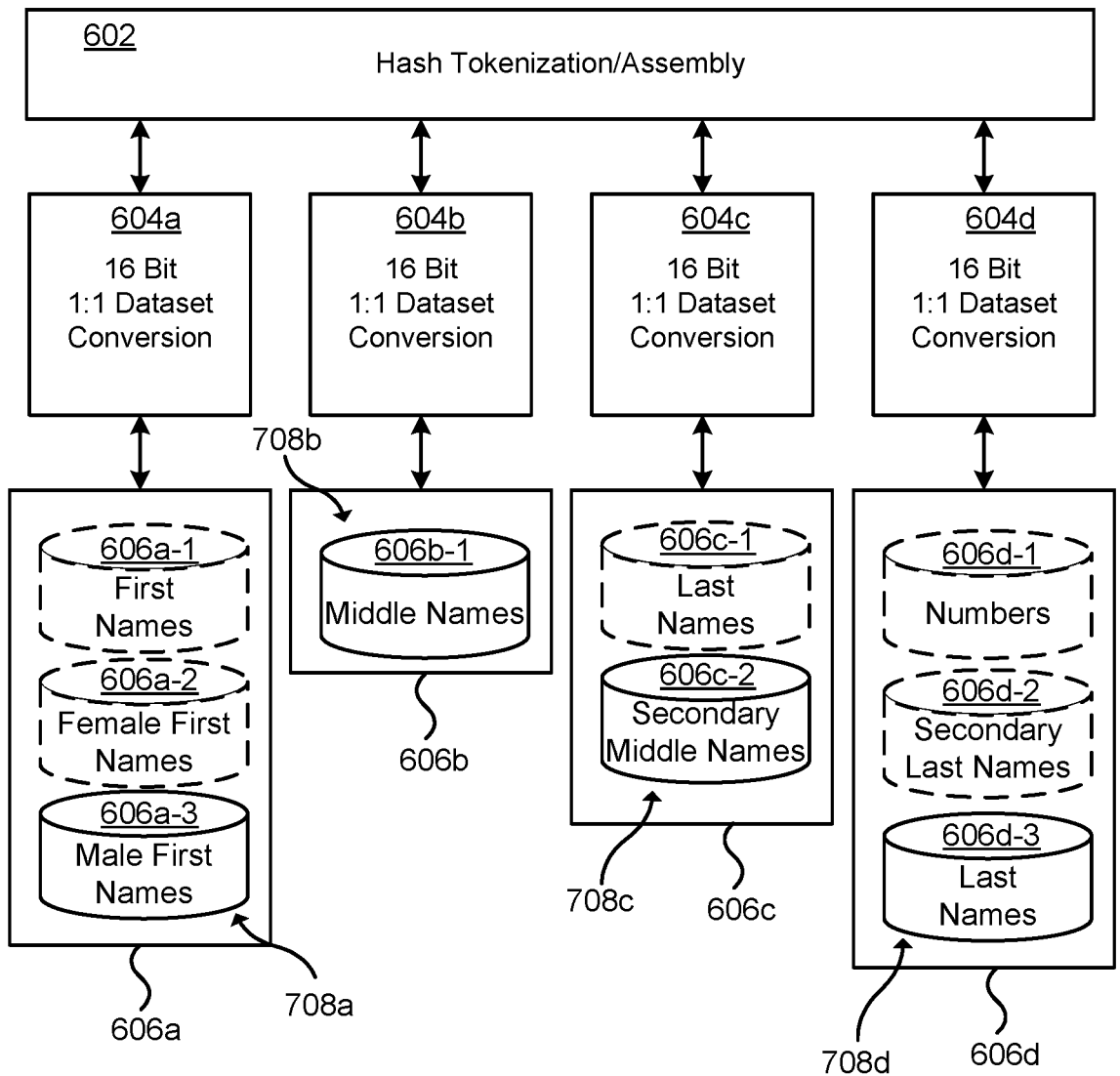
FIG. 7 depicts further generation of a human-readable identifier.
Figure 10:
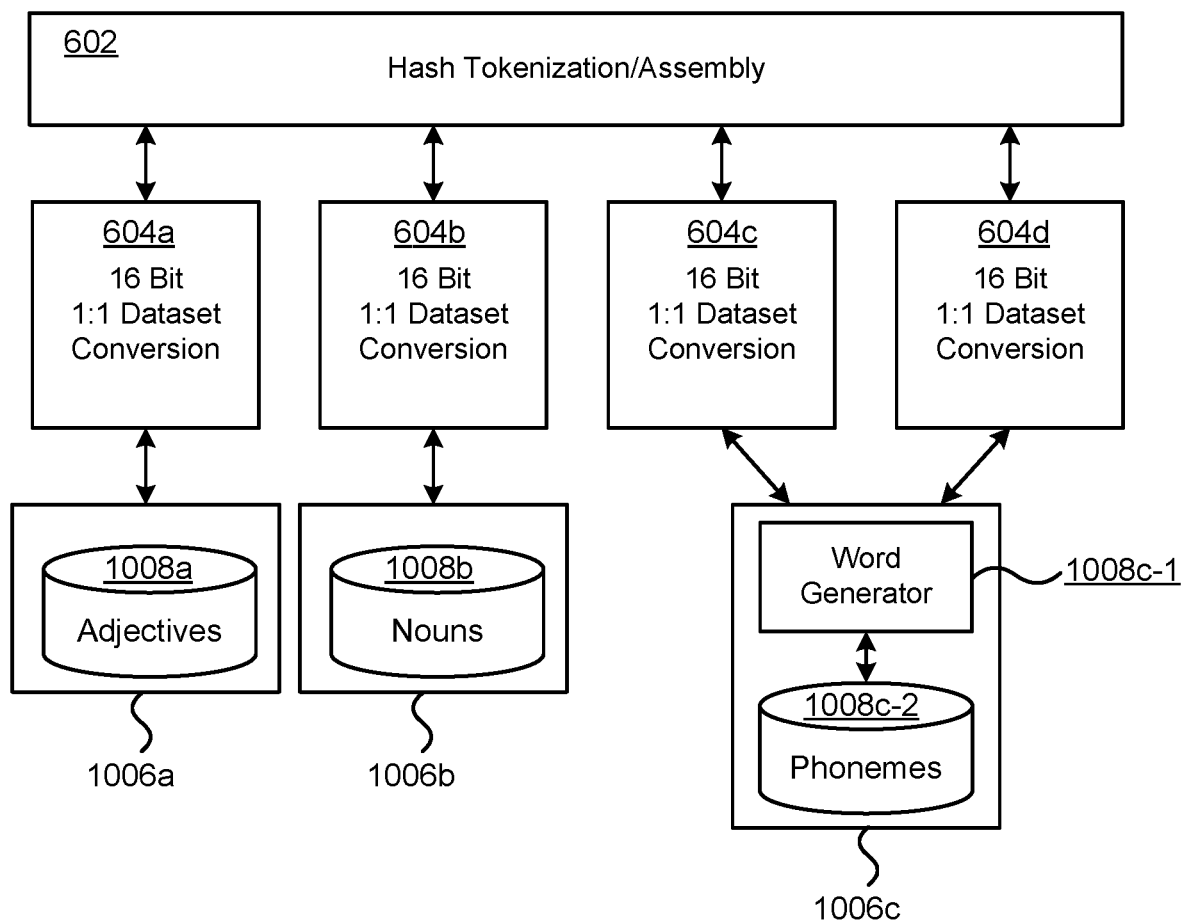
FIG. 10 depicts further generation of a human-readable identifier.
Figure 11:
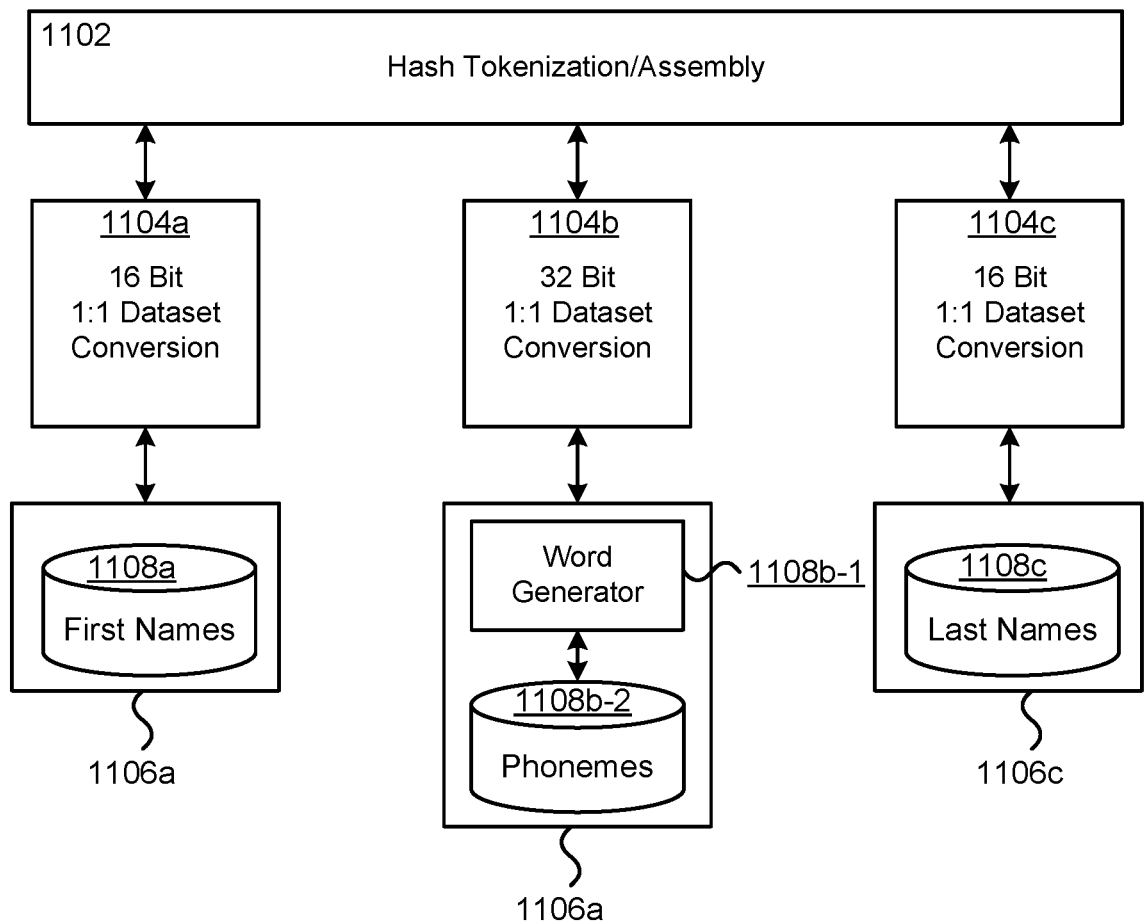
FIG. 11 depicts further generation of a human-readable identifier.

As described above, a hashed value is split into a plurality of hash tokens, each of which are converted to a human readable token in a deterministic 1:1 conversion process. FIGS. 6-11 depict various implementations of the hash tokenization and 1:1 conversion. In the description of FIGS. 6-11, similar components are referred to using the same reference numbers and the similar functionality may not be repeated in each Figure. in order to highlight differences. As described above, the 1:1 conversion can provide semantic context to the hash value so that it corresponds, or at least resembles the semantic context of the sensitive data being anonymized. That is, the conversion process may generate strings that appear to be names if the sensitive data being anonymized is a name. FIGS. 6, 7, and 11 assume that the sensitive data being anonymized is a name. FIGS. 9-10 assume the sensitive data being anonymized is an internal project name or code name. In each of FIGS. 6-11, the hash values being converted are depicted as 64-bit hash values. Although depicted with regard to 64-bit hash values, the techniques can be readily adapted for different sizes of hashed values. FIGS. 6-10 depict a hash tokenization assembly 602 that splits the hash into 4 16-bit hash tokens, which are converted by respective conversion components 604*a* . . . 604*d* to corresponding human readable tokens.

Figure 8:
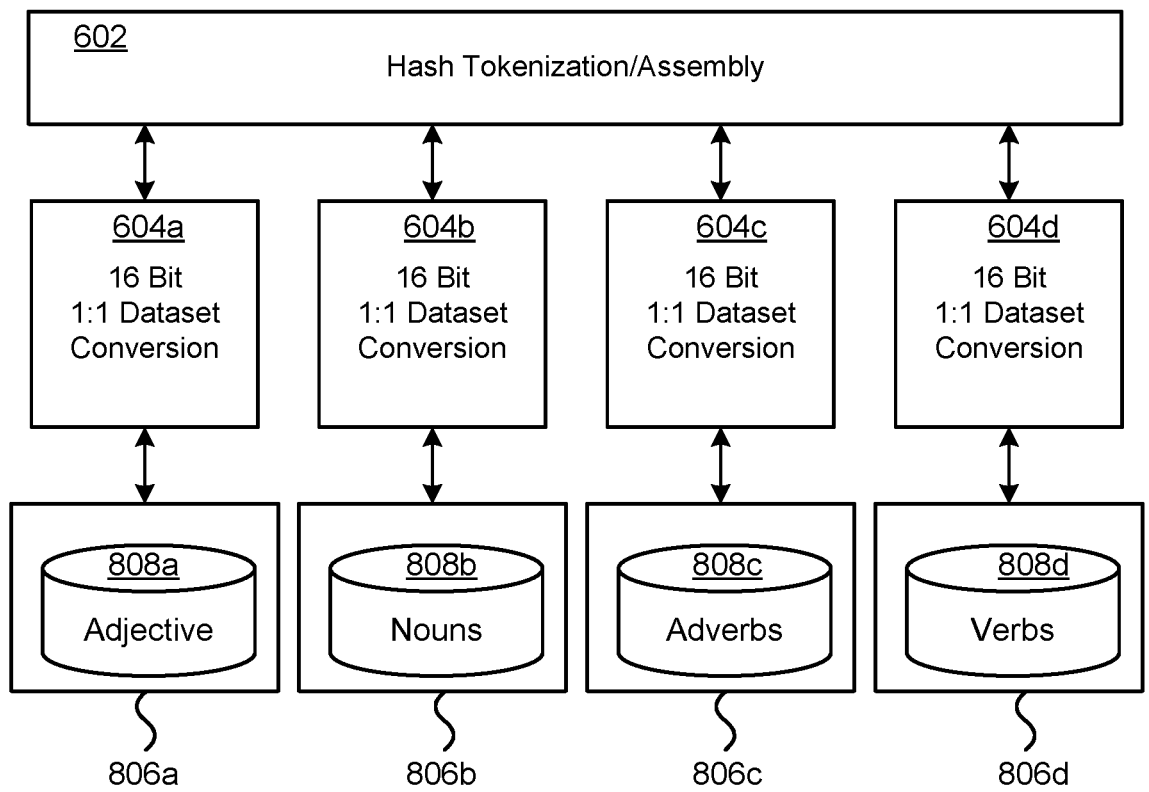
FIG. 8 depicts further generation of a human-readable identifier.
Figure 9:
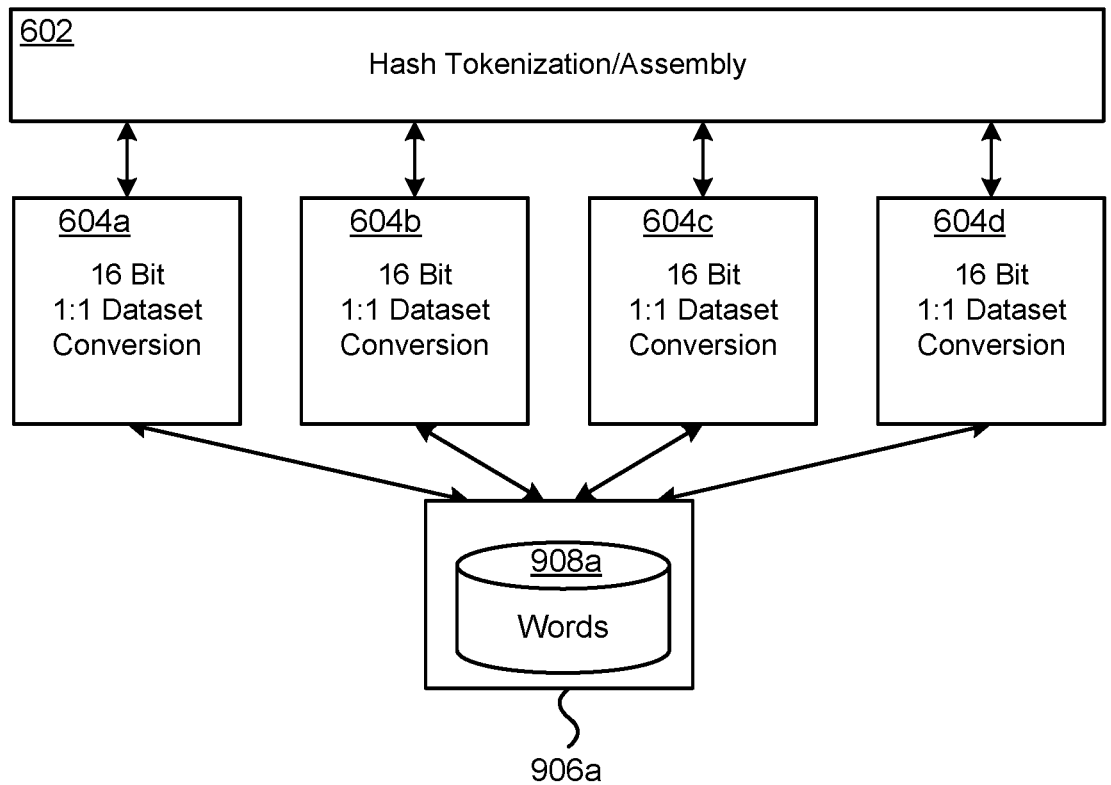
FIG. 9 depicts further generation of a human-readable identifier.

FIGS. 6-9 depict generation of a human-readable identifier. As depicted, each 1:1 conversion component 604*a* . . . 604*d* uses the respective hash token to lookup a human readable token stored in a database. As depicted, each of the 1:1 converters may be associated with one or more databases. Different 1:1 converters 604*a* . . . 604*d* may be associated with different databases as depicted in FIGS. 6-8. Additionally or alternatively different 1:1 converters 604*a* . . . 604*d* may be associated with the same databases as depicted in FIG. 9.

As depicted in FIGS. 6 and 7, each 1:1 converter 604*a* . . . 604*d* is associated with a database or group of databases 606*a* . . . 606*d* for converting a hash token to a human readable token. Each grouping of databases 606*a* may comprise one or more databases suitable for converting a hash token. For example, a first database grouping 606*a* may comprise one or more databases 606*a*-1 . . . 606*a*-3 that comprise first names. The databases may include a set for both female and male first names, just male first names and just female first names. Similarly the second grouping of databases may comprise names suitable for middle names 606*b*-1, the third database grouping 606*c* may comprise databases 606*c*1 . . . 606*c*2 suitable for an end portion of the human readable identifier. As depicted the third database grouping 606*c* may include a database of last names 606*c*-1 as well as a database of secondary middle names 606*c*-2. The last grouping of databases 606*d* may comprise databases suitable for the end of the human readable identifier, including a numbers database 606*d*-1, secondary last names 606*d*-2 and last names 606*d*-3. Although described as a numbers database, it will be appreciated that if a number is used, a lookup need not be performed and instead the bit value may be used.

As depicted in FIGS. 6 and 7, each 1:1 converter 604*a* . . . 604*d* may select from one or more databases when converting a hash token to a human readable hash token. The particular database selected may depend upon the context of the data being anonymized, user preference, or may be predetermined. In FIGS. 6 and 7 the database selected for use by the respective 1:1 conversion processes 604*a* . . . 604*d* are shown in solid lines, while those not selected are shown in broken lines. As depicted, the 1:1 conversion of FIG. 6 would result in a human readable identifier of a First Name 608*a*, a Middle Name 608*b*, a Last Name 608*c* and a Number 608*d*. In contrast, the 1:1 conversion depicted in FIG. 7 would result in a different human readable identifier by selecting different database. In particular, FIG. 7 would result in a human readable identifier comprising a Male First Name 708*a*, a Middle Name 708*b*, a Secondary Middle Name 708*c* and a Last Name 708*d*. Regardless of the particular database selected, the conversion process is similar, namely the hash token is used as an index to select one of the names in the database.

FIG. 8 is similar to the hash tokenization/assembly described above; however, rather than selecting human readable tokens from databases suitable for an individual's name, the 1:1 converters 604*a* . . . 604*d* select from databases of words 806*a* . . . 806*d* that may be grouped into adjectives, nouns, adverbs and verbs. The resulting human readable identifier in FIG. 8 would have the form of Adjective 808*a*, Noun 808*b*, Adverb 808*c* and Verb 808*d*. FIG. 9 depicts a similar process; however, rather than being selected from databases of words associated with different parts of speech, the 1:1 converters select human readable tokens from a database of words 906*a*. The human readable identifier would comprise four Words 908*a*.

The 1:1 conversion depicted in FIG. 10 is similar to that depicted in FIG. 8; however rather than converting hash tokens 604*c*, 604*d* using a database of adverbs 806*c* and verbs 806*d* respectively, the conversion 604*c*, 604*d* use a word generation function 1006 that generates a word-like string using word generation functionality 1008*c*-1 that algorithmically combines phonemes from a database 1008*c*-2 to form a pronounceable word-like string. The phonemes being combined together, may be determined from the hash token being converted.

FIG. 11 depicts a similar process for generating name-like human readable identifiers from 64 bit hash values. The hash tokenization/assembly 1102 splits the hash value into 3 hash tokens and assembles the 3 human readable tokens into the human readable identifier. The first 1:1 converter 1104*a* converts a 16 bit hash token using a first names database 1106*a*. The second 1:1 converter 1104*b* converts a 32 bit hash token to a word-like token using word generation functionality 1106*b*-1 that selects and combines phonemes from a database of phonemes 1106*b*-2. The third 1:1 converter 1104*c* convers a 16 bit hash token using a last names database 1106*c*.

As described above, the particular format of the human readable identifier produced by the hash conversion depends upon the database selected, or the word generator used. The particular selection may be set based on application needs, such as what data is to be anonymized, and/or other factors such as user preferences.

Figure 12:
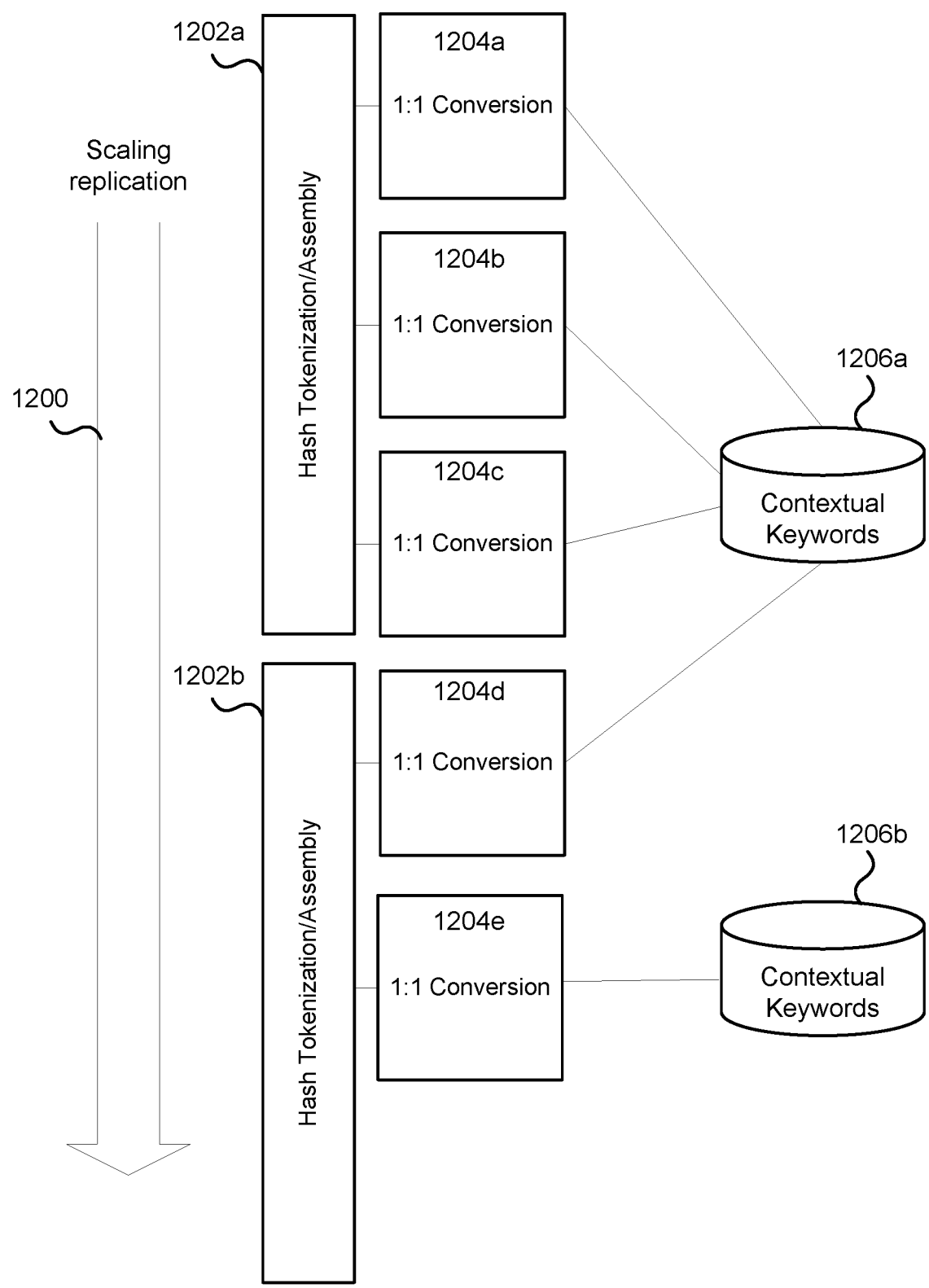
FIG. 12 depicts scaling of the anonymization process.

FIG. 12 depicts scaling of the anonymization process. Since the anonymization process described above uses a deterministic 1:1 process for converting hash values to corresponding human readable identifiers, the process scales easily. As depicted as scaling requirements increase additional component can be replicated 1200 as needed. For example, additional hash tokenization assembly process 1202*a*, 1202*b* may be created. The hash tokenization processes 1202*a*, 1202*b* may communicate with a number of 1:1 conversion processes that 1204*a* . . . 1204*e* that all perform the same functionality. The contextual keywords databases 1206*a*, 1206*b* can be easily replicated as needed in order to be able to handle the required access demands.

Additionally or alternatively, rather than replicating components to meet increasing demand, the replication may be done to provide the same anonymization process at different geographic locations.

In some embodiments a system including a processor and memory implements a method of anonymizing sensitive data where the method includes: splitting a secure hashed value generated from sensitive data to be anonymized into a plurality of hash tokens; converting each of the plurality of hash tokens to a respective human-readable token using a 1:1 conversion process; and concatenating the plurality of human-readable tokens into an anonymized human-readable identifier of the sensitive data. In at least one embodiment the system further includes a display. In at least some embodiments the method further includes The method further includes using the anonymized human-readable identifier instead of the secure hashed value for display in a user interface. In some embodiments this involves displaying the anonymized human-readable identifier on a display. In at least one embodiment includes generating a display value for the anonymized human-readable identifier; and using the display value instead of the secure hashed value for display in a user interface. In at least one such embodiment, using the display value instead for the secure hashed value includes displaying the display value instead of the secure hashed value on the display.

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the system and method described herein may be provided by various combinations of software, firmware and/or hardware, other than the specific implementations described herein as illustrative examples.

The techniques of various embodiments may be implemented using software, hardware and/or a combination of software and hardware. Various embodiments are directed to apparatus, e.g. a node which maybe used in a communications system or data storage system. Various embodiments are also directed to non-transitory machine, e.g., computer, readable medium, e.g., ROM, RAM, CDs, hard discs, etc., which include machine readable instructions for controlling a machine, e.g., processor. to implement one, more or all of the steps of the described method or methods.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments devices and nodes described herein are implemented using one or more components or modules to perform the steps corresponding to one or more methods, for example, has generation, transmitting, processing, and/or receiving steps. Thus, in some embodiments various features are implemented using components or modules. Such components or modules may be implemented using software, hardware or a combination of software and hardware. In some embodiments each component or module is implemented as an individual circuit with the device or system including a separate circuit for implementing the function corresponding to each described component or module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and/or associated hardware, to perform one or more or all of the steps of the above-described method(s). Some embodiments are directed to a device including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more or all of the steps described above. Depending on the embodiment, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the method(s) described herein. The processor may be for use in, e.g., a communications device or other device described in the present application.

Various features in the present application relate to a technical problem of how to anonymize sensitive data and, in particular, how to anonymize sensitive data for use in a user interface, e.g., where the anonymized data maybe and sometimes will be displayed to a user.

Numerous additional variations on the methods and apparatus of the various embodiments described above will be apparent to those skilled in the art in view of the above description. Such variations are to be considered within the scope.

What is claimed is:

1. A method of anonymizing sensitive data comprising:
splitting a secure hashed value generated from sensitive data to be anonymized into a plurality of hash tokens, wherein the plurality of hash tokens can be concatenated together to provide the secure hashed value;
converting each of the plurality of hash tokens to a respective human-readable token using a 1:1 conversion process;

concatenating the plurality of human-readable tokens into an anonymized human-readable identifier of the sensitive data; and using the anonymized human-readable identifier for display in a user interface, said step of using the anonymized human-readable identifier including:

receiving a plurality of additional anonymized human-readable identifiers for display in the user interface;

generating a unique display value of the anonymized human-readable identifier by shortening the anonymized human-readable identifier, said shortening of the anonymized human-readable identifier including removing one or more human-readable tokens from the anonymized human-readable identifier and performing a comparison among the plurality of additional anonymized human-readable identifiers to ensure that the resulting shortened anonymized human-readable identifier is unique amongst display values of the plurality of additional anonymized human-readable identifiers in the user interface; and displaying the unique display value of the anonymized human-readable identifier instead of the hashed value in the user interface.

2. The method of claim 1, wherein the 1:1 conversion process converts respective ones of the plurality of hash tokens to the respective human-readable tokens that are semantically equivalent to the sensitive data to be anonymized.

3. The method of claim 2, wherein the 1:1 conversion process converts a respective one of the plurality of hash tokens to the respective human-readable token by concatenating a plurality of phonemes selected based on the respective one of the plurality of hash tokens.

4. The method of claim 2, wherein the 1:1 conversion process converts a respective one of the plurality of hash tokens to the respective human-readable token by looking up the human-readable token in a database using the respective one of the plurality of hash tokens.

5. The method of claim 4, wherein the database comprises one or more of:
a listing of first names;
a listing of female first names;
a listing of male first names;
a listing of middle names;
a listing of last names;
a listing of secondary last names;
a listing of numbers;
a listing of adjectives;
a listing of nouns;
a listing of adverbs;
a listing of verbs; and
a listing of words.

6. The method of claim 5, further comprising:
receiving a semantic identifier associated with the sensitive data to be anonymized; and
selecting one of the listings from the database to be used in converting the respective hash token to the respective human-readable token.

7. The method of claim 1, further comprising:
receiving the sensitive data to be anonymized; and
performing a cryptographic hash function on the sensitive data to generate the secure hashed value.

8. The method of claim 7, wherein the secure hashed value generated by the cryptographic hash function comprises a 128-bit value.

9. The method of claim 1, further comprising:
receiving the sensitive data to be anonymized;
performing a cryptographic hash function on the sensitive data to generate a secure intermediary hashed value of at least 128 bits; and
condensing the secure intermediary hashed value to the secure hashed value, wherein the secure hashed value is 64 bits.

10. The method of claim 9, wherein condensing the secure intermediary hashed value comprises one of:
removing bits from the secure intermediary hashed value; and
performing a hash of the secure intermediary hashed value.

11. A system of anonymizing sensitive data comprising:
a processing unit for executing instructions; and
a memory unit for storing instructions, which when executed by the processing unit configures the system to:

split a secure hashed value generated from sensitive data to be anonymized into a plurality of hash tokens;

convert each of the plurality of hash tokens to a respective human-readable token using a 1:1 conversion process;

concatenate the plurality of human-readable tokens into an anonymized human-readable identifier of the sensitive data; and use the anonymized human-readable identifier for display in a user interface by:

receiving a plurality of additional anonymized human-readable identifiers for display in the user interface;

generating a unique display value of the anonymized human-readable identifier by shortening the anonymized human-readable identifier, said shortening of the anonymized human-readable identifier including removing one or more human-readable tokens from the anonymized human-readable identifier and performing a comparison among the plurality of additional anonymized human-readable identifiers to ensure that the resulting shortened anonymized human-readable identifier is unique amongst display values of the plurality of additional anonymized human-readable identifiers in the user interface; and displaying the unique display value of the anonymized human-readable identifier instead of the hashed value in the user interface.

12. The system of claim 11, wherein the 1:1 conversion process converts respective ones of the plurality of hash tokens to the respective human-readable tokens that are semantically equivalent to the sensitive data to be anonymized.

13. The system of claim 12, wherein the 1:1 conversion process converts a respective one of the plurality of hash tokens to the respective human-readable token by concatenating a plurality of phonemes selected based on the respective one of the plurality of hash tokens.

14. The system of claim 12, wherein the 1:1 conversion process converts a respective one of the plurality of hash tokens to the respective human-readable token by looking up the human-readable token in a database using the respective one of the plurality of hash tokens.

15. The system of claim 14, wherein the database comprises one or more of:
- a listing of first names;
- a listing of female first names;
- a listing of male first names;
- a listing of middle names;
- a listing of last names;
- a listing of secondary last names;
- a listing of numbers;
- a listing of adjectives;
- a listing of nouns;
- a listing of adverbs;
- a listing of verbs; and
- a listing of words.

16. The system of claim 15, wherein the instructions, which when executed by the processing unit further configure the system to:
- receive a semantic identifier associated with the sensitive data to be anonymized; and
- select one of the listings in the database to be used in converting the respective hash token to the respective human-readable token.

17. The system of claim 11, wherein the instructions, which when executed by the processing unit further configure the system to:
- receive the sensitive data to be anonymized; and
- perform a cryptographic hash function on the sensitive data to generate the secure hashed value.

18. The system of claim 17, wherein the secure hashed value generated by the cryptographic hash function comprises a 128-bit value.

19. The system of claim 11, wherein the instructions, which when executed by the processing unit further configure the system to:
- receive the sensitive data to be anonymized;
- perform a cryptographic hash function on the sensitive data to generate a secure intermediary hashed value of at least 128 bits; and
- condense the secure intermediary hashed value to the secure hashed value, wherein the secure hashed value is 64 bits.

20. The system of claim 19, wherein condensing the secure intermediary hashed value comprises one of:
- removing bits from the secure intermediary hashed value; and
- performing a hash of the secure intermediary hashed value.

* * * * *